United States Patent [19]
Brick et al.

[11] Patent Number: 5,395,743
[45] Date of Patent: Mar. 7, 1995

[54] PHOTOGRAPHIC ELEMENT HAVING A TRANSPARENT MAGNETIC LAYER AND A PROCESS OF PREPARING THE SAME

[75] Inventors: Mary C. Brick, Webster; Robert O. James, Rochester; Donald J. Majka, Rochester; Ronald M. Wexler, Rochester, all of N.Y.

[73] Assignee: Eastman Kodak Company, Rochester, N.Y.

[21] Appl. No.: 173,793

[22] Filed: Dec. 22, 1993

[51] Int. Cl.$^6$ ............ G03C 1/76; G03C 3/00; G11B 5/633
[52] U.S. Cl. ............ 430/496; 430/501; 430/523; 430/140; 428/694 B; 428/694 BB; 428/694 BR; 428/694 BN; 428/694 BA
[58] Field of Search ........ 430/495, 496, 501, 140, 430/523; 428/694 B, 694 BG, 694 BU, 694 BY, 694 BS, 694 BR, 694 BN, 694 BA, 694 BB

[56] References Cited

U.S. PATENT DOCUMENTS

| | | | |
|---|---|---|---|
| 3,782,947 | 1/1974 | Krall | 430/495 |
| 3,917,639 | 11/1975 | Paget et al. | |
| 3,996,059 | 12/1976 | Stansfield et al. | |
| 4,042,413 | 8/1977 | Hauxwell et al. | |
| 4,157,266 | 6/1979 | Hauxwell et al. | |
| 4,163,749 | 8/1979 | Hauxwell et al. | |
| 4,166,066 | 8/1979 | Hauxwell et al. | |
| 4,224,212 | 9/1980 | Topham | |
| 4,279,945 | 7/1981 | Audran et al. | 430/140 |
| 4,398,955 | 8/1983 | Stansfield et al. | |
| 4,518,435 | 5/1985 | Stansfield et al. | |
| 4,645,611 | 2/1987 | Campbell et al. | |
| 4,797,440 | 1/1989 | Schofield et al. | |
| 4,820,581 | 4/1989 | Saito et al. | 428/694 BN |
| 4,861,380 | 8/1989 | Campbell et al. | |
| 4,954,177 | 9/1990 | Schofield | |
| 4,990,276 | 2/1991 | Bishop et al. | 430/523 |
| 5,147,768 | 9/1992 | Sakakibara | 430/501 |
| 5,217,804 | 6/1993 | James et al. | 428/694 B |
| 5,229,259 | 7/1993 | Yokota | 430/523 |
| 5,252,441 | 10/1993 | James et al. | 430/496 |

FOREIGN PATENT DOCUMENTS

| | | |
|---|---|---|
| 1342746 | 1/1974 | United Kingdom. |
| 1373660 | 11/1974 | United Kingdom. |

*Primary Examiner*—Charles L. Bowers, Jr.
*Assistant Examiner*—Mark F. Huff
*Attorney, Agent, or Firm*—Robert A. Gerlach

[57] ABSTRACT

A photographic element comprising a support, having at least a silver halide light-sensitive layer and a transparent magnetic recording layer, the transparent magnetic layer having ferromagnetic particles in a polymeric binder, ferromagnetic particles having a size of at least 30 m$^2$/gm and being present in the transparent magnetic layer in a coverage of from about $1 \times 10^{-11}$ mg/$\mu$m$^3$ to about $1 \times 10^{-10}$ mg/$\mu$m$^3$, the polymeric binder containing up to about 25 weight percent based on the weight of the polymeric binder of a dispersant-cobinder comprising a poly(C$_{2-4}$-alkyleneimine) carrying at least two mono- or poly(carbonyl-C$_{1-7}$-alkyleneoxy) groups.

46 Claims, No Drawings

PHOTOGRAPHIC ELEMENT HAVING A TRANSPARENT MAGNETIC LAYER AND A PROCESS OF PREPARING THE SAME

BACKGROUND OF THE INVENTION

1. Field of the Invention

This invention relates to improved photographic elements having a transparent magnetic recording layer and to a process of preparing the same. More particularly, the invention related to transparent magnetic recording layers having a higher degree of transparency while at the same time, demonstrating improved resistance to abrasion and scratching which would impair the quality of the photographic reproduction.

2. Description of Related Art

It is known from various U.S. patents, including: U.S. Pat. Nos. 3,782,947; 5,217,804; 5,229,259, and others; to include in a light-sensitive silver halide photographic element a transparent magnetic recording layer. Such elements are advantageous because they can be employed to record images by the customary photographic process while at the same time information can be recorded into and read from the magnetic recording layer by the techniques similar to that employed in the magnetic recording art.

A difficulty, however, arises in that magnetic recording layers generally employed in the magnetic recording industry are opaque, not only because of the nature of the magnetic particles, but also because of the requirements that the recording layer contains other additives which further create problems with regard to the optical characteristics of the layer. Also, the requirements of recording and reading of the magnetic signal from a transparent magnetic layer present on a photographic element are more stringent than that found in conventional magnetic recording because of the loading of the magnetic particles in the transparent magnetic layer and the nature of the photographic element.

Thus, the presence of the magnetic recording layer cannot interfere with the primary function of the photographic element which is to achieve realistic visual reproductions of the original image. In addition, the magnetic recording layer must be capable of accurately recording the information applied thereto and reproducing (reading) the information on demand. This is particularly difficult because the loading and physical condition of the magnetic particles in the transparent layer must be such as to not interfere with the quality of the photographic elements.

Finally, the photographic element and particularly the transparent magnetic recording layer provided thereon must be capable of repeated use in both the recording and reading mode and, therefore, must be durable, abrasion resistant and scratch resistant so as not to adversely affect the quality of the photographic element. For example, during the residence of the film in a camera, entries may be made to the magnetic recording layer for every exposure, and an indeterminate number of read operations are conducted depending on the particular application to which the film is used. This also is true in the processing of the film and in subsequent use of the processed film for additional copies, enlargements and the like. Thus, a reasonable number of contacts between the film and magnetic heads to which the film will be required to withstand is at least 60 operations.

It can, therefore, be readily seen that it is highly desirable to provide photographic elements having a transparent magnetic recording layer exhibiting improved magnetic and photographic performance as well as improved running durability, abrasion resistance and scratch resistance. This goal is extremely difficult to achieve because of the nature, concentration, and physical condition of the magnetic particles required to provide sufficient signal to write and read magnetically stored data, the effect of any noticeable color, haze, or grain associated with the magnetic layer on the photographic layers and the effect of the magnetic layer on the optical density and granularity of the photographic layers. Thus, all of these various characteristics must be considered both independently and cumulatively in order to arrive at a commercially viable photographic element containing a transparent magnetic recording layer that will not have a detrimental effect on the photographic performance and still withstand repeated and numerous passages through the recording and reading zones of a suitable apparatus. Also, because of the curl of the element, primarily due to the photographic layers and core set, the film must be held tightly against the magnetic heads to pressures much higher than those in conventional magnetic recording in order to maintain film plane flatness in the recording and reading zone.

Also, there is a need for a method to prepare such a photographic element on a commercial scale.

SUMMARY OF THE INVENTION

The invention provides an improved photographic element including a support, having a silver halide, light-sensitive layer and a transparent magnetic recording layer, the transparent magnetic recording layer comprising a transparent polymeric binder and ferromagnetic particles, the ferromagnetic particles having a surface area greater than 30 $m^2/gm$ and a coverage of from about $1 \times 10^{-11}$ $mg/\mu m^3$ to about $1 \times 10^{-10}$ $mg/\mu m^3$, the polymeric binder containing up to about 25 weight percent based on the weight of the polymeric binder of a dispersant-cobinder comprising poly($C_{2-4}$-alkyleneimine) carrying at least two mono- or poly-(carbonyl-$C_{1-7}$-alkyleneoxy) groups.

The invention also provides an improved method of making photographic elements having a transparent magnetic recording layer by providing a dispersion of magnetic particles in a solvent solution of a polymeric binder containing up to about 25 weight percent of the polyalkyleneimine described above and coating the dispersion onto a suitable support.

The invention is advantageous because the polyalkyleneimine is readily capable of being crosslinked, is compatible with suitable solvents that permit both ease of milling and handling on a large scale, is optically transparent and adds substantially no optical density in the visible spectrum particularly in the range of 400 to 500 nanometers. Further, the polyalkyleneimine serves a dual function in that it acts as a dispersant for low solids dispersions while at the same time serves as a cobinder which can be crosslinked. In addition, when abrasive particles are employed in the transparent magnetic layer to provide magnetic head cleaning properties, the presence of the polyalkyleneimine stabilizes the dispersion prior to coating without subsequently interfering with the head cleaning properties.

DETAILED DESCRIPTION OF PREFERRED EMBODIMENTS

The invention in its broadest aspects, contemplates a photographic element having a transparent magnetic recording layer where the polymeric binder contains from about 0.05 to about 25 weight percent based on the weight of the polymeric binder of a dispersant-cobinder comprising the polyalkyleneimine described.

The dispersant-cobinder is named as such because the polyalkyleneimine serves two functions. First, it serves as a dispersing agent for particulate material employed in the transparent magnetic recording layer. The particulate material may be the ferromagnetic particles. The dispersant-cobinder may be added in the grind phase of the preparation to aid in the breaking up of magnetic particle agglomerates or in subsequent steps (letdown) to prevent reagglomeration of the particles.

The particulate material may also be abrasive particles as disclosed in U.S. patent application Ser. No. 08/171,785, now abandoned and refiled as U.S. patent applications Ser. Nos. 08/193,304 and 08/193,686, entitled Photographic Element filed on even date herewith by some of the same applicants as this application and assigned to the same assignee. In this case, the dispersant-cobinder may be added in the same manner and for the same purpose as expressed above with respect to the magnetic particles.

The dispersant-cobinder is added in an effective amount to maintain the particulate material in an unagglomerated state.

The dispersant-cobinder is added to adequately disperse the solid particulate materials present in the transparent magnetic layer, i.e., the magnetic particles and/or the abrasive particles. Thus, particle agglomerates that cause unwanted visual anomalies in the photographic element are substantially eliminated. The dispersant-cobinder, even in small quantities less than 0.1% by weight in the transparent layer, improve the photographic element with respect to transparency and physical characteristics including durability, scratch resistance and head clogging. This is especially true when the layer contains a crosslinking agent. Further, additional quantities of the dispersant-cobinder up to a total of 25 percent by weight, based on the weight of the binder may be employed to provide further improvements in the physical characteristics of the transparent magnetic layer.

The coating composition for preparing transparent magnetic layers in accordance with this invention may also contain coating aids, surfactants, grind solvents, stabilizers, crosslinking agents, catalysts and the like. The coating composition is applied to a suitable support which may contain additional layers for promoting adhesion, by any suitable coating device including slot die hoppers, slide hoppers, gravure coaters, reverse roll coaters and the like.

The magnetic layer can also be overcoated with conventional layers including antistats, protective overcoats, lubricants and the like.

The dispersant-cobinder is a poly ($C_{2-4}$-alkyleneimine) carrying at least two mono- or poly-(carbonyl-$C_{1-7}$-alkyleneoxy) groups.

Each alkylene group in the carbonyl-$C_{1-7}$-alkyleneoxy group (hereinafter referred to as the "CAO group") or the poly(carbonyl-$C_{1-7}$-alkeneoxy) group (hereinafter referred to as the "PCAO chain") preferably contains from 3 to 6 carbon atoms, an especially preferred alkylene group being pentamethylene wherein the CAO group is 5-oxypentamethylene-1-carbonyl (hereinafter-referred to as "OPMC") which is derivable from E-caprolactone. The PCAO chain may contain a mixture of alkylene groups of different length but is preferably a homopolymer, especially of OPMC. The PCAO chain or the CAO group may carry a chain-stopping terminal group at the free end, such as optionally substituted alkyl, e.g. alkyl, alkoxyalkyl or haloalkyl, where the absence of a terminal hydroxy group prevents formation or further growth of the PCAO chain. The PCAO chain preferably contains from 2 to 100, and more preferably from 3 to 80, CAO groups.

The CAO group and PCAO chain can be conveniently represented by the general formula:

$$T-(O-V-CO)_n-$$

wherein

T is H or a terminal chain stopping group;
V is a $C_{1-7}$-alkylene group;
and n is a number from 1 to 100.

When n=1 Formula I represents a CAO group and when n>1 Formula I represents a PCAO chain.

Each CAO group or PCAO chain is preferably linked to the poly($C_{2-4}$-alkyleneimine) (hereinafter referred to as "PAI") through a covalent "amide" link,

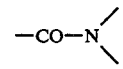

formed between a terminal carbonyl group (—CO—) of the CAO group or PCAO chain and the nitrogen atom (N) of a primary or secondary amino group in the PAI, or through an ionic "salt" link,

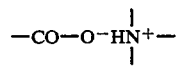

between a terminal carboxylate group (—CO—O⁻) of the CAO group or the PCAO chain and the positively charged nitrogen atom (+N) of a substituted ammonium group in the PAI. Because the dispersant-cobinder contains at least two CAO groups or PCAO chains it may contain a mixture of amide and salt links depending upon the severity of the conditions under which it is prepared.

The dispersant-cobinder can be conveniently represented by the following general formula:

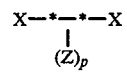

wherein

X—*—*—X represents a poly($C_{2-4}$-alkyleneimine) (PAI);
Z represents a CAO group or PCAO chain linked to the PAI through an amide or salt link;
and p is a number from 2 to 2000.

The dispersant-cobinder preferably contains from 4 to 2000 (p=4 to 2000) and more preferably from 4 to 1000(p=4 to 1000) CAO groups or PCAO chains.

The PAI is preferably a poly(ethyleneimine), hereinafter referred to as "PEI", which may be branched or straight-chained. A preferred dispersant-cobinder comprises PEI carrying at least two CAO groups or PCAO chains attached thereto by amide and/or salt links. The PAI preferably has a weight-average molecular weight from 500 to 600,000 and more preferably from 1,000 to 200,000.

The dispersant-cobinder may be derived from a PAI and a CAO acid or a PCAO acid, i.e., a compound of the formula:

$$H-(O-C_{1-7}\text{-alkylene}-CO)_n-OH$$

in which n is from 1 to 100, or a cyclic precursor thereof, such as a lactone. The length of the PCAO chain in the PCAO acid may be controlled by the presence of chain stopper, such a carboxylic acid free from hydroxy groups, in the preparative process. Where the dispersant carries PCAO chains formed by the polymerization of a carbonylalkyleneoxy monomer, such as a lactone, in the presence of the PAI, there is less need for a chain stopper, because the PCAO chain grows on the PAI and cannot react together; in such a case the pendant PCAO chains may be terminated by hydroxy groups.

The dispersant-cobinder may be derived from a PAI having at least two primary, secondary or tertiary amino groups, and a CAO or PCAO acid, in which case reaction between a p-, s- or t-amino group in the PAI and a terminal carboxyl group on the CAC or PCAO acid forms an amide or salt link. If the PAI contains a t-amino group only salt links can be formed, otherwise salt and/or amide links are formed depending on the reaction conditions. Generally, mild reaction conditions such as low temperatures and/or short reaction times promote the formation of salt links and more severe conditions, such as high temperatures and/or long reaction times promote the formation of amide links in a manner which is familiar to the skilled chemist.

Each CAO group is preferably terminated by a group which is free from OH/NH$_2$ groups, such as alkylcarbonyl. Termination is conveniently effected by reaction of a CAO acid, or lactone precursor, with a carboxylic acid which is free from hydroxy or amino groups, e.g., an alkane- or an alkoxyalkane-carboxylic acid, such as caproic acid, lauric acid, stearic acid, methoxyacetic acid and especially by such an acid containing twelve or more, preferably 12 to 25, carbon atoms. Lauric acid is preferred.

Where the dispersant-cobinder contains free amino groups these may be converted into substituted ammonium groups by reaction with an acid or a quaternizing agent so that the dispersant-cobinder is in the form of a substituted ammonium salt. Suitable reagents for this purpose are mineral and strong organic acids or acidic salts, such as acetic acid, sulphuric acid, hydrochloric acid, alkylsulphonic acids, alkyl hydrogen sulphates and arylsulphonic acids, especially acid forms of dyes and pigments, and quaternising agents such as dimethyl sulphate (DMS), methyl and ethyl halides and diethyl sulphate (DES).

Where the PAI is PEI, the weight ratio of CAO acid or PCAO acid to PEI is preferably at least 1:1 and is more preferably in the range from 1:1 to 30:1. It is especially preferred, in the case of a dispersant-cobinder based on PEI and a PCAO acid derived from E-caprolactone, that the weight ratio of the PCAO acid to PEI is from 1.5:1 to 30:1. The equivalent molar ratios of the two reactants depends, of course, on their respective average molecular weights.

Suitable materials useful in accordance with this invention are described in U.S. Pat. No. 4,861,380 incorporated herein by reference. A preferred material is sold by Zeneca, Inc. (ICI) under the trade designation Solsperse 24000.

It is preferred to employ the dispersant-cobinder in combination with a compound having the formula $$\underset{R'}{\overset{\overset{O}{\|}}{R''C-CH}-\overset{\overset{O}{\|}}{C}-OR}$$

where
R is alkyl having 1 to 8 carbon atoms, phenyl or benzyl;
R' is hydrogen, methyl or ethyl,; and
R" is alkyl having 1 to 5 carbon atoms, may be used.

In the above formula, R is alkyl having 1-8 carbon atoms such as, for example, methyl, ethyl, propyl, butyl, pentyl, hexyl, heptyl, octyl, isopropyl, isobutyl, tertiary butyl, isopentyl, neopentyl, 2,3 dimethyl butyl, 2,5 dimethylhexyl, and the like. R" is an alkyl having 1-5 carbon atoms. Those radicals having 1-5 carbon atoms mentioned above with respect to R are suitable for R". Suitable compounds in accordance with this invention and within the above stated formula include methyl acetoacetate, ethyl acetoacetate, n-propyl acetoacetate, n-butyl acetoacetate, n-pentyl acetoacetate, n-hexyl acetoacetate, n-heptyl acetoacetate, n-octyl acetoacetate, neopentyl acetoacetate, isopropyl acetoacetate, tert-butyl acetoacetate, 2,5 dimethylhexyl acetoacetate, methyl propionylacetate, ethyl propionylacetate, n-hexyl propionylacetate, isopropyl propionylacetate, 2,5 dimethylhexyl propionylacetate, methyl-2-methylacetoacetate, methyl-2-ethylacetoacetate, n-butyl-2-methylacetoacetate, isopropyl-2-ethylacetoacetate, n-octyl-2-methylacetoacetate and the like. Methyl acetoacetate is preferred.

Any suitable photographic film support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethylpentene, polysulfone, polyethersulfone, polyarylates, polyether imides and the like. Particularly preferred supports are polyethylene terephthalate, polyethylene naphthalate and the cellulose esters particularly cellulose triacetate.

Thickness of those supports used in the present invention is from 50 μm to 180 μm, preferably, 85 to 125 microns. In addition, various dyes may be formulated into the support or the magnetic layer to give neutral density.

Depending upon the nature of the support, suitable transparent tie or undercoat layers may be desired. Particularly with regard to polyester supports, primers are used in order to promote adhesion. Any suitable primers in accordance with those described in the following U.S. patents maybe employed: U.S. Pat. Nos.

2,627,088; 3,501,301; 4,689,359; 4,363,872; and 4,098,952. Each of these are incorporated herein by reference in their entirety.

The ferromagnetic pigments comprise ferromagnetic iron oxides, such as $\gamma$-$Fe_2O_3$, $Fe_3O_4$ or $\gamma Fe_2O_3$ or $Fe_3O_4$ with Co, Zn or other metals in solid solution or surface treated, or ferromagnetic chromium dioxides, such as $CrO_2$ or $CrO_2$ with metallic elements, for example Li, Na, Sn, Pb, Fe, Co, Ni and Zn, or halogen atoms in solid solution. Ferromagnetic metal pigments with an oxide coating on their surface to improve their chemical stability or to improve dispersibility, as is commonly used in conventional magnetic recording, may also be used in accordance with the invention. In addition, magnetic oxides with a thicker layer of lower refractive index oxide or other material having a lower optical scattering cross-section as taught in U.S. Pat. Nos. 5,217,804 and 5,252,444 may also be used. Cobalt surface treated gamma iron oxide is the preferred ferromagnetic material for use in accordance with this invention.

Examples of the abrasive particles include nonmagnetic inorganic powders with a Mobs scale hardness of not less than 6. Specific examples are metal oxides such as aluminum oxides, such as, alpha-alumina, corundum, chromium oxide ($Cr_2O_3$), iron oxide (alpha-$Fe_2O_3$), tin oxide, doped tin oxide, such as antimony or indium doped tin oxide, silicon dioxide alumino-silicate and titanium dioxide; carbides such as silicon carbide and titanium carbide; and diamond in fine powder. Alpha alumina, the tin oxides or mixtures thereof, is the preferred abrasive in accordance with this invention. The tin oxide and doped tin oxides can be used in either their conductive or non-conductive form; however, when in the conductive form, an additional advantage is gained in that a dual purpose is served, that being the particles serve as abrasive particles in addition to conducting particles, the layer thereby acting as an antistat. Suitable conductive particles are disclosed in U.S. Pat. No. 4,495,276; 4,394,441; 4,431,764; 4,418,141 and 4,999,276 incorporated herein by reference.

The binders used in the magnetic layer in combination with the dispersant-cobinder include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic esteracrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene, chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenolic resins, epoxy resins, thermosetting polyurethane resins, urea resins, melamine resins, alkyl resins, urea-formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. The most preferred binder is cellulose diacetate. For crosslinking of the binder with isocyanates, the binder should contain active hydrogen atoms as determined by the Zerewitinoff test, such active hydrogen atoms including —OH, —$NH_2$—NHR, where R is an organic radical, and the like, as described in U.S. Pat. No. 3,479,310.

A dispersing agent, sometimes referred to as a wetting agent or a surface active agent, can be present in the dispersion to facilitate dispersion of the magnetic particles and/or wetting of the particles with the dispersing medium. This helps to further minimize agglomeration of the magnetic particles. The dispersing agent can be present in the dispersion in an amount up to about 0.02%, preferably 0.001 to 0.01%, by weight. Useful dispersing agents include fatty acid amines, and commercially available wetting agents such as Witco Emcol CC59 which is a quaternary amine available from Witco Chemical Corp. Rhodafac PE 510, Rhodafac RE 610, Rhodafac RE 960, and Rhodafac LO 529 which are phosphoric acid esters available from Rhom Poulenc. Other constituents of the coating composition including grind solvents, coating aids, and solvents for the binder are included. Suitable grind solvents include, for example, an ester of an acid such as phthalic acid. Preferred esters are dialkylesters of phthalic acid, the alkyl portion of which can contain from 1 to about 12, preferably 4 to 8, carbon atoms. Exemplary useful esters include dimethyl phthalate, diethyl phthalate, dioctyl phthalate, dipropyl phthalate, and dibutyl phthalate as disclosed in U.S. Pat. No. 4,990,276 issued to Bishop et al. and assigned to the same assignee as this application.

Suitable coating aids include nonionic fluorinated alkyl esters such as, FC-430 and FC-431 sold by Minnesota Mining and Manufacturing Co., polysiloxanes such as, Dow Corning DC 1248, DC 200, DC 510, DC 190; General Electric SF 1079, SF 1023, SF 1054, and SF 1080; BYK Chemie BYK 310, BYK 320 and BYK 322.

Additional organic solvents suitable for the preparation of the dispersion include ketones, such as acetone, methyl ethyl ketone and cyclohexanone, alcohols, esters, such as ethyl acetate and butyl acetate, cellosolves, ethers, such as tetrahydrofuran aromatic solvents, such as toluene, and chlorinated hydrocarbons as solvents, such as carbon tetrachloride, chloroform, dichloromethane; tetrahydrofuran and, as mentioned above, the ketoesters of U.S. application Ser. No. 08/173,833 filed on even date herewith, entitled Coating Compositions For A Transparent Magnetic Recording Layer, by R. M. Wexler and assigned to the same assignee as the immediate application, which are preferred. Most preferred as solvents are mixtures of the ketoesters with methylene chloride and lower alkyl ketones.

Preferably, the binder and dispersant-cobinder in the magnetic layer are crosslinked employing any suitable crosslinking agent such as, for example, organic isocyanates; aziridines, as taught in U.S. Pat. No. 4,225,665; and melamines such as methoxymethylmelamine, and the like as set forth in U.S. Pat. No. 5,198,499 to Anderson et al. issued Mar. 30, 1993 and assigned to the same assignee as this application.

Any suitable organic polyisocyanate can be used as the crosslinking agent such as, tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compounds such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. The preferred polyisocyanates employed as a crosslinking agent is the reaction product of trimethyl propane and 2,4 tolylene diisocyanate sold by Mobay Co. under the trade designation Mondur CB 75.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micron. Particle concentrations less than about 10 mg/m$^2$ tend to be insufficient for magnetic recording purposes and particle concentrations greater than about 1000 mg/m$^2$ tend to be too dense for photographic purposes. Particularly useful magnetic particle concentrations are in the range of 20–70 mg/m$^2$. This gives a saturation magnetic moment of about 1.5 emu/m$^2$ to 4.9 emu/m$^2$ for suitable cobalt surface treated gamma Fe$_2$O$_3$ or cobalt surface treated Fe$_3$O$_4$ which provide suitable signal strength for a recording system. Concentrations of about 20 mg/m$^2$ have been found to be particularly useful in reversal films and concentrations of about 40 mg/m$^2$ are particularly useful in negative films.

The photographic elements according to this invention can contain one or more conducting layers such as antistatic layers and/or anti-halation layers such as such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide and vanadium pentoxide.

The photographic elements according to this invention can be provided with a protective or lubricating layer, such as a wax layer, on or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

The invention will be further illustrated by the following examples in which parts and percentages are given by weight unless otherwise specified.

Example 1

A cellulose diacetate/cellulose triacetate binder with magnetic particles and abrasive particles is cast to a thickness of about 1.2 microns onto subbed polyethylene terephthalate from a dispersion composition as shown in Table I. The dispersion is prepared by adding a dispersion of the magnetic particle, stabilized with Rhodafac PE 510 and cellulose triacetate, in methylene chloride and dibutyl phthalate to a cellulose diacetate solution in methylene chloride/acetone/methyl acetoacetate using a high shear mixer. A dispersion of the abrasive particles in propylene glycol monomethyl ether with Solsperse 24000 is then added using a high shear mixer and a coating aid is then added with low shear. Subsequently, the cast magnetic layer is overcoated with 2.5 mg/sq.ft. of carnauba wax.

TABLE 1

| Dispersion Ingredient | Function | Weight Percent |
|---|---|---|
| Cellulose Diacetate | Binder | 2.545 |
| Cellulose Triacetate | Binder/Dispersion Stabilizer | 0.115 |
| Toda CSF-4085V2 | Magnetic Particle | 0.115 |
| Rhodafac PE510 | Surfactant | 0.005 |
| Dibutyl Phthalate | Grind Solvent | 0.141 |
| Norton E-600 | Abrasive Particle | 0.157 |
| Zeneca Solsperse 24000 | Dispersant-Cobinder | 0.031 |
| 3M FC-431 | Coating Aid | 0.015 |
| Methylene chloride | Solvent | 67.371 |
| Acetone | Solvent | 24.061 |
| Methyl acetoacetate | Solvent | 4.815 |
| Propylene Glycol Methyl Ether | Solvent | 0.629 |

Comparative Example C-1

A cellulose diacetate/cellulose triacetate binder with magnetic particles and abrasive particles is cast to a dry thickness of about 1.2 microns onto subbed polyethylene terephthalate from a dispersion composition as shown in Table I. The dispersion is prepared as described in Example I except that the dispersion of the abrasive particles did not contain any Solsperse 24000.

TABLE C-1

| Dispersion Ingredient | Function | Weight Percent |
|---|---|---|
| Cellulose Diacetate | Binder | 2.546 |
| Cellulose Triacetate | Binder/Dispersion Stabilizer | 0.117 |
| Toda CSF-4085V2 | Magnetic Particle | 0.117 |
| Rhodafac PE510 | Surfactant | 0.006 |
| Dibutyl Phthalate | Grind Solvent | 0.137 |
| Norton E-600 | Abrasive Particle | 0.149 |
| 3M FC-431 | Coating Aid | 0.015 |
| Methylene chloride | Solvent | 67.419 |
| Acetone | Solvent | 24.079 |
| Methyl acetoacetate | Solvent | 4.818 |
| Propylene Glycol Methyl Ether | Solvent | 0.597 |

Example 2

A cellulose diacetate/cellulose triacetate binder with magnetic particles and abrasive particles is cast to a dry thickness of 25-35 μm onto a Kapton Type 200 HN polyimide support sold by DuPont from a dispersion composition as shown in Table 2. The dispersion is prepared as described in Example 1 except that polyisocyanate crosslinking agent and stannous octoate catalyst are added. Also, the dispersion of the abrasive particles has methyl acetoacetate as the dispersing medium and the carnauba wax overcoat is omitted.

TABLE 2

| Dispersion Ingredient | Function | Weight Percent |
|---|---|---|
| Cellulose Diacetate | Binder | 2.281 |
| Cellulose Triacetate | Binder/Dispersion Stabilizer | 0.122 |
| Toda CSF-4085V2 | Magnetic Particle | 0.122 |
| Rhodafac PE510 | Surfactant | 0.008 |
| Dibutyl Phthalate | Grind Solvent | 0.252 |
| Mobay Mondur CB-75 | Crosslinking Agent | 0.57 |
| Stannous Octoate | Catalyst | 0.029 |
| Sumitomo AKP-50 | Abrasive Particle | 0.141 |
| Zeneca Solsperse 24000 | Dispersant-Cobinder | 0.004 |

TABLE 2-continued

| Dispersion Ingredient | Function | Weight Percent |
|---|---|---|
| 3M FC-431 | Coating Aid | 0.015 |
| Methylene chloride | Solvent | 67.519 |
| Acetone | Solvent | 24.114 |
| Methyl acetoacetate | Solvent | 4.823 |

Example 3

A cellulose diacetate/cellulose triacetate binder with magnetic particles and abrasive particles is cast to a dry thickness of 25-35 μm onto a Kapton support from a dispersion composition as shown in Table 3. The dispersion is prepared as described in Example 2.

TABLE 3

| Dispersion Ingredient | Function | Weight Percent |
|---|---|---|
| Cellulose Diacetate | Binder | 2.081 |
| Cellulose Triacetate | Binder/Dispersion Stabilizer | 0.122 |
| Toda CSF-4085V2 | Magnetic Particle | 0.122 |
| Rhodafac PE510 | Surfactant | 0.008 |
| Dibutyl Phthalate | Grind Solvent | 0.252 |
| Mobay Mondur CB-75 | Crosslinking Agent | 0.52 |
| Stannous Octoate | Catalyst | 0.026 |
| Sumitomo AKP-50 | Abrasive Particle | 0.141 |
| Zeneca Solsperse 24000 | Dispersant-Cobinder | 0.27 |
| 3M FC-431 | Coating Aid | 0.015 |
| Methylene chloride | Solvent | 67.51 |
| Acetone | Solvent | 24.111 |
| Methyl acetoacetate | Solvent | 4.822 |

EVALUATION METHODS

Haze Measurement

The haze of lubricated cast layers is evaluated with an XL-211 Hazegard System by measuring transmitted light on a percentage basis for any light deviating by more than 2.5° from the incident beam.

Glass Transition Measurement

The glass transition temperature of free standing layers is evaluated by dynamic mechanical analysis using a Rheometrics DMA with RSA2 software. This is done by measuring the storage and the loss moduli of the layer as a function of temperature and determining the temperature at the peak of the loss modulus/storage modulus ratio.

TABLE 4

| Example Number | % Haze |
|---|---|
| 1 | 9.2 |
| 2 | 8.3 |
| 3 | 8.0 |
| C-1 | 16.0 |

As is apparent from the results in Table 4, Example 1, 2 and 3 greatly improves the transparency of the magnetic layer.

TABLE 5

| Example Number | Tg (°C.) | Relative Solvent Resistance* |
|---|---|---|
| 1 | 172 | 2 |
| C-1 | 174 | 2 |
| 2 | 188 | 16 |
| 3 | 198 | 100 |

*The magnetic layer of each example on a polyethylene terephalate support is repeatedly wiped in the same area with a cotton swab wet with methylene chloride until the magnetic layer is completely removed. The number is recorded.

Examples 4–6 and Comparative Example C-2

A color photographic recording material for color negative development is prepared by applying the following layers in the given sequence to the opposite side of each of the supports of Examples 1–3 and Comparative Example C-1, respectively. The quantities of silver halide are given in grams of silver per $m^2$. The quantities of other materials are given in g per $m^2$.

Layer 1 {Annihilation Layer} black colloidal silver sol containing 0.236 g of silver, with 2.44 g gelatin.

Layer 2 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 3 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming masking coupler CM-1 at 0.022 g, DIR compound D-1 at 0.011 g, with gelatin at 1.66 g.

Layer 4 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 5 {Interlayer} Yellow dye material YD-1 at 0.11 g and 1.33 g of gelatin

Layer 6 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler MM-1 at 0.067 g with gelatin at 1.78 g.

Layer 7 {Second (more) Green-Sensitive Layer} Green sensitized silver iodobromide emulsion 4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 8 {Third (most) Green-Sensitive Layer) Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 9 {Interlayer} Yellow dye material YD-2 at 0.11 g with 1.33 g gelatin.

Layer 10 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 11 {Second (more) Blue-Sensitive Layer} Blue sensitized silver iodobromide emulsion mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-1 0.022 g, DIR compound D-5 at 0.05 g, BAR compound B-1 at 0.006 g with gelatin at 1.97 g.

Layer 12 {Protective Layer} 0.111 g of dye UV-1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The formulas for the component materials are as follows:

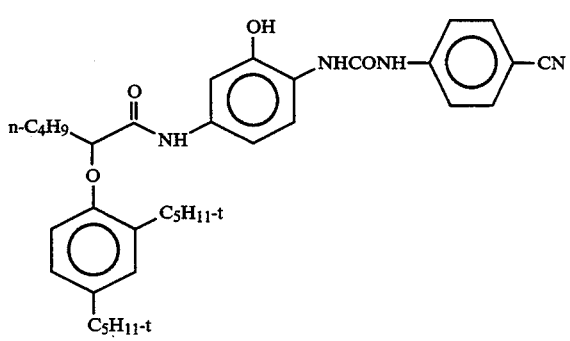

-continued
CM-1
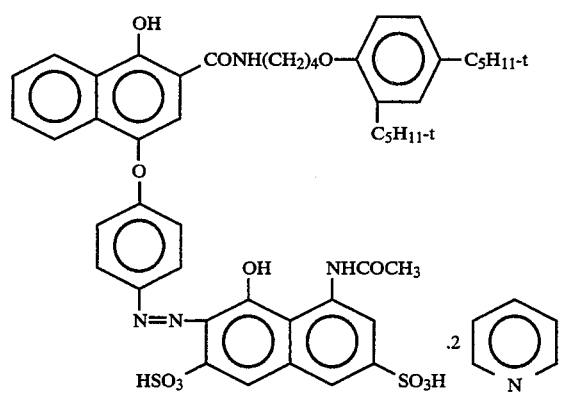
B-1
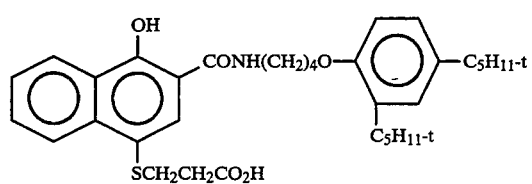
D-1:
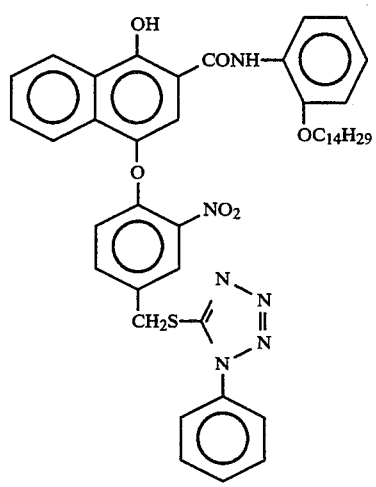
D-2
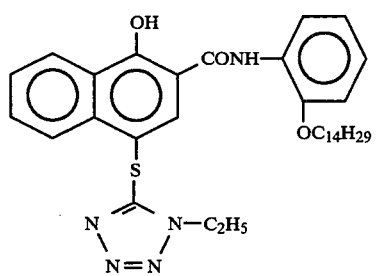
D-3:
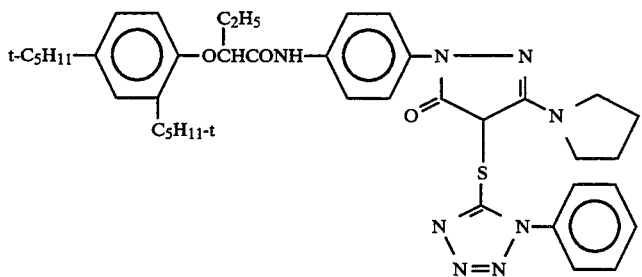

-continued
D-4
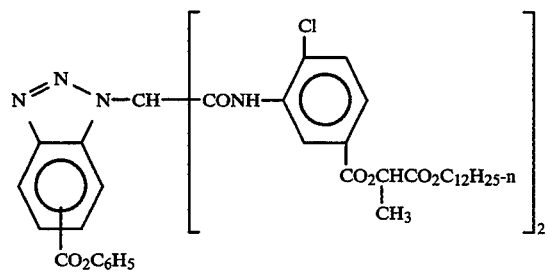
D-5:
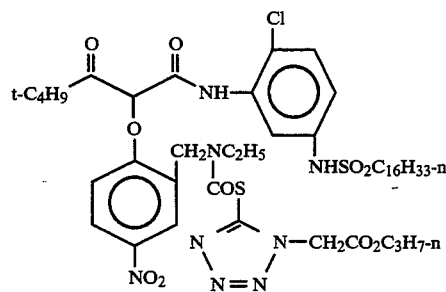
MM-1
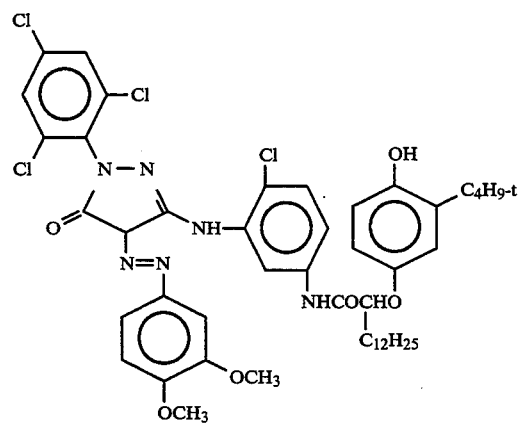
Y-1:
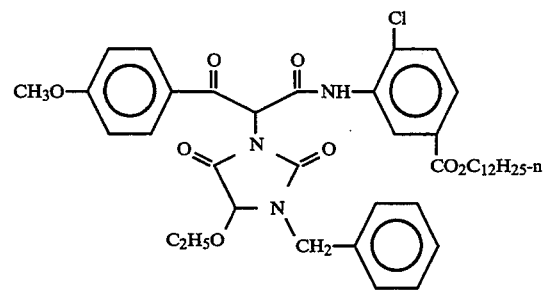
Y-2:
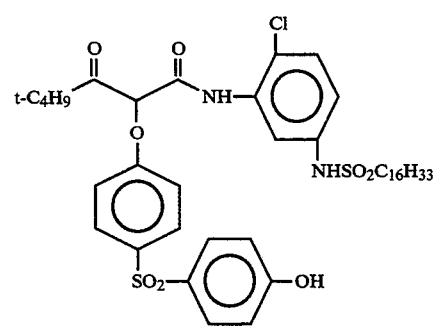

-continued

M-1:
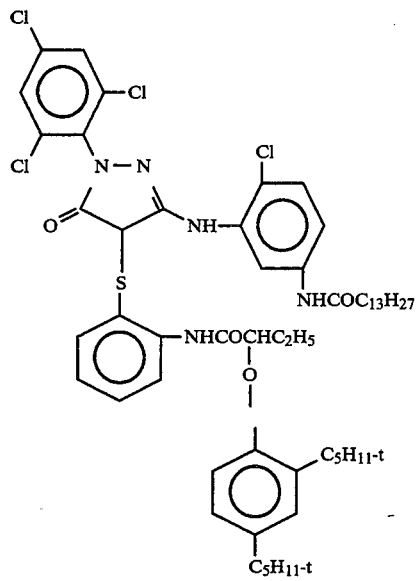

YD-1:
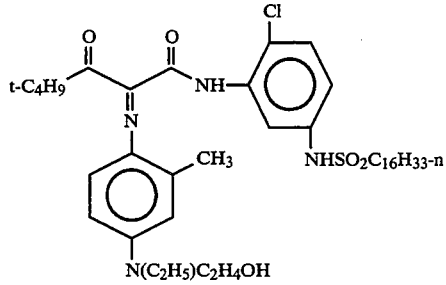

YD-2:
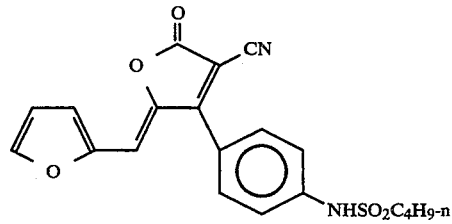

UV-1:
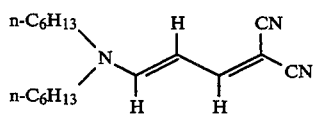

UV-2:
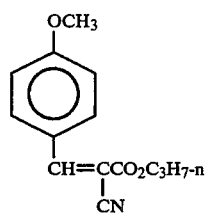

H-1: CH$_2$(SO$_2$CH=CH$_2$)$_2$

The invention has been described in detail with particular reference to preferred embodiments thereof, but it will be understood that variations and modifications can be effected within the spirit and scope of the invention.

What is claimed is:

1. A photographic element comprising a support, having at least a silver halide light-sensitive layer and a transparent magnetic recording layer, the transparent magnetic layer having ferromagnetic particles in a polymeric binder, the ferromagnetic particles having a surface area of at least 30 m$^2$/gm and being present in the transparent magnetic layer in a coverage of from about $1 \times 10^{-11}$ mg/$\mu$m$^3$ to about $1 \times 10^{-10}$ mg/$\mu$m$^3$, the polymeric binder containing from about 0.05 to about 25 weight percent based on the weight of the polymeric binder for a dispersant-cobinder comprising a poly($C_{2-4}$-alkyleneimine) carrying at least two mono- or poly-(carbonyl-$C_{1-7}$-alkyleneoxy) groups.

2. The photographic element of claim 1 wherein the dispersant-cobinder has the formula

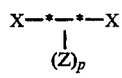

wherein

X—*—*—X represents a poly($C_{2-4}$-alkyleneimine) (PAI);

Z represents a mono(carbonylalkyleneoxy) (CAO) group or a poly(carbonyl-$C_{1-7}$-alkyleneoxy) (PCAO) group linked to the PAI through an amide or salt link;

and p is a number from 2 to 2000.

3. The photographic element of claim 2 wherein the CAO and PCAO groups are of the formula:

wherein

T is H or a terminal chain stopping group;

V is a $C_{1-7}$-alkylene group;

and n is a number from 1 to 100.

4. The photographic element of claim 2 wherein P is 4 to 2000.

5. The photographic element of claim 1 wherein polymeric binder and the dispersant-cobinder are crosslinked.

6. The photographic element of claim 5 wherein the polymeric binder and poly($C_{2-4}$ alkyleneimine) are crosslinked with an aziridine, melamine or isocyanate.

7. The photographic element of claim 6 wherein the polymeric binder and dispersant-cobinder are crosslinked with an isocyanate.

8. The photographic element of claim 1 wherein the transparent magnetic recording layer includes (a) a compound having the formula

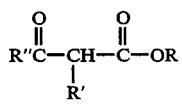

where

R is alkyl having 1 to 8 carbon atoms, phenyl or benzyl;

R' is hydrogen, methyl or ethyl,; and

R" is alkyl having 1 to 5 carbon atoms, and (b) methylene chloride, lower alkyl ketones or mixtures of methylene chloride and lower alkyl ketones.

9. The photographic element of claim 8 wherein the compound is methyl acetoacetate.

10. The photographic element of claim 1 wherein the polymeric binder contains active hydrogen atoms as determined by the Zerewitinoff test.

11. The photographic element of claim 1 wherein the polymeric binder is a cellulose ester, a polyurethane or a vinyl polymer.

12. The photographic element of claim 11 wherein the polymeric binder is a cellulose ester.

13. The photographic element of claim 12 wherein the cellulose ester is cellulose acetate.

14. The photographic element of claim 13 wherein the cellulose acetate is cellulose diacetate.

15. The photographic element of claim 14 wherein the cellulose diacetate is crosslinked with an isocyanate.

16. The photographic element of claim 11 wherein the polymeric binder is a polyurethane.

17. The photographic element of claim 11 wherein the polymeric binder is a vinyl polymer.

18. A photographic element comprising a support, having at least a silver halide light-sensitive layer and a transparent magnetic recording layer, the transparent magnetic layer having ferromagnetic particles and abrasive particles in a polymeric binder, the ferromagnetic particles having a surface area of at least 30 $m^2/gm$ and being present in the transparent magnetic layer in a coverage of from about $1 \times 10^{-11}$ mg/$\mu m^3$ to about $1 \times 10^{-10}$ mg/$\mu m^3$, the abrasive particles having an average diameter of from about 0.04 to about 0.4 and a Mohs hardness of at least 6, the polymeric binder containing from about 0.05 to about 25 weight percent based on the weight of the polymeric binder of a dispersant-cobinder comprising a poly($C_{2-4}$-alkyleneimine) carrying at least two mono- or poly-(carbonyl - $C_{1-7}$-alkyleneoxy) groups.

19. The photographic element of claim 18 wherein the dispersant-cobinder has the formula

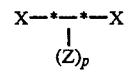

wherein

X—*—*—X represents a poly(C2-4-alkyleneimine) (PAI);

Z represents a mono(carbonylalkyleneoxy) (CAO) group or a poly(carbonyl-$C_{1-7}$-alkyleneoxy) (PCAO) group linked to the PAI through an amide or salt link;

and p is a number from 2 to 2000.

20. The photographic element of claim 18 wherein the CAO and PCAO groups are of the formula:

wherein

T is H or a terminal chain stopping group;

V is a $C_{1-7}$-alkylene group;

and n is a number from 1 to 100.

21. The photographic element of claim 18 wherein P is 4 to 2000.

22. The photographic element of claim 18 wherein polymeric binder and the dispersant-cobinder are crosslinked.

23. The photographic element of claim 22 wherein the polymeric binder and poly($C_{2-4}$ alkyleneimine) are crosslinked with an aziridine, melamine or isocyanate.

24. The photographic element of claim 23 wherein the polymeric binder and dispersant-cobinder are crosslinked with an isocyanate.

25. The photographic element of claim 18 wherein the transparent magnetic layer includes (a) a compound having the formula

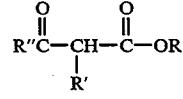

where
- R is alkyl having 1 to 8 carbon atoms, phenyl or benzyl;
- R' is hydrogen, methyl or ethyl; and
- R" is alkyl having 1 to 5 carbon atoms, and
(b) methylene chloride, lower alkyl ketones or mixtures of methylene chloride.

26. The photographic element of claim 25 wherein the compound is methyl acetoacetate.

27. The photographic element of claim 18 wherein the polymeric binder contains active hydrogen atoms as determined by the Zerewitinoff test.

28. The photographic element of claim 18 wherein the polymeric binder is a cellulose ester, a polyurethane or a vinyl polymer.

29. The photographic element of claim 28 wherein the polymeric binder is a cellulose ester.

30. The photographic element of claim 29 wherein the cellulose ester is cellulose acetate.

31. The photographic element of claim 30 wherein the cellulose acetate is cellulose diacetate.

32. The photographic element of claim 31 wherein the cellulose diacetate is crosslinked with an isocyanate.

33. The photographic element of claim 28 wherein the polymeric binder is a polyurethane.

34. The photographic element of claim 28 wherein the polymeric binder is a vinyl polymer.

35. A method of making a photographic element having a silver halide light-sensitive layer and a transparent magnetic recording layer on a support comprising forming a first dispersion of ferromagnetic particles having a surface area of at least 30 m²/gm in a solution of a polymeric binder polymer in a first solvent, forming a second dispersion of abrasive particles in a second solvent, at least the first or second dispersion containing from about 0.05 to about 25 weight percent based on the weight of the binder of a dispersant-cobinder comprising a poly($C_{2-4}$-alkyleneimine) carrying at least two mono- or poly-(carbonyl-$C_{1-7}$-alkyleneoxy) groups, combining the first and second dispersions, to form a coating composition, applying the coating composition to a photographic film support and applying at least one silver halide light-sensitive layer to the opposite side of the film support.

36. The method of claim 35 wherein the second dispersion contains the dispersant-cobinder.

37. The method of claim 35 wherein at least the first or second solvent comprise a compound having the formula

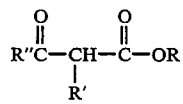

where
- R is alkyl having 1 to 8 carbon atoms, phenyl or benzyl;
- R' is hydrogen, methyl or ethyl; and
- R" is alkyl having 1 to 5 carbon atoms, and
(b) methylene chloride, lower alkyl ketones or mixtures of methylene chloride and a lower alkyl ketone.

38. The method of claim 37 wherein the first solvent comprises the compound having the formula.

39. The method of claim 37 wherein the second solvent comprises the compound having the formula.

40. The method of claim 35 wherein a crosslinking agent is added to the coating composition.

41. The method of claim 40 wherein the crosslinking agent is an aziridine, melamine or an isocyanate.

42. The method of claim 41 wherein the crosslinking agent is an isocyanate.

43. The method of claim 35 wherein the polymeric binder contains active hydrogen atoms as determined by the Zerewitinoff test.

44. The method of claim 43 wherein the polymeric binder is a cellulose ester, a polyurethane or a vinyl polymer.

45. The method of claim 44 wherein the polymeric binder is a cellulose ester.

46. The method of claim 45 wherein the cellulose acetate is cellulose diacetate.

* * * * *